US009525627B2

United States Patent
Padgett et al.

(10) Patent No.: US 9,525,627 B2
(45) Date of Patent: Dec. 20, 2016

(54) NETWORK PACKET ENCAPSULATION AND ROUTING

(71) Applicant: Google Inc., Mountain View, CA (US)

(72) Inventors: Steven Padgett, Sunnyvale, CA (US); Edward Crabbe, San Francisco, CA (US); Paul Schultz, Saratoga, CA (US)

(73) Assignee: Google Inc., Mountain View, CA (US)

( * ) Notice: Subject to any disclaimer, the term of this patent is extended or adjusted under 35 U.S.C. 154(b) by 176 days.

(21) Appl. No.: 14/287,431

(22) Filed: May 27, 2014

(65) Prior Publication Data

US 2015/0350069 A1    Dec. 3, 2015

(51) Int. Cl.
| | |
|---|---|
| H04J 3/24 | (2006.01) |
| H04L 12/721 | (2013.01) |
| H04L 12/761 | (2013.01) |
| H04L 12/803 | (2013.01) |
| H04L 12/26 | (2006.01) |
| H04L 12/46 | (2006.01) |
| H04L 29/12 | (2006.01) |

(52) U.S. Cl.
CPC ........... *H04L 45/72* (2013.01); *H04L 12/4633* (2013.01); *H04L 43/0811* (2013.01); *H04L 45/16* (2013.01); *H04L 47/125* (2013.01); *H04L 61/2592* (2013.01)

(58) Field of Classification Search
None
See application file for complete search history.

(56) References Cited

U.S. PATENT DOCUMENTS

| | | | |
|---|---|---|---|
| 5,940,394 A | 8/1999 | Killian | |
| 7,139,828 B2 | 11/2006 | Alkhatib | |
| 7,656,795 B2 | 2/2010 | Jakubik | |
| 8,045,550 B2 | 10/2011 | LaVigne | |
| 8,090,858 B2 | 1/2012 | Poeyhoenen | |
| 8,165,140 B2 | 4/2012 | Sultan | |
| 8,259,571 B1 | 9/2012 | Raphel | |
| 8,725,898 B1 * | 5/2014 | Vincent | H04L 61/2061 709/238 |

(Continued)

OTHER PUBLICATIONS

A.D. Durand et al., "Stateless Deterministic NAT" [online], (retrieved on Jan. 21, 2014). Retrieved from the Internet: http://tools.ietf.org/id/draft-penno-softwire-sdnat-00.html, 11 pages.

(Continued)

*Primary Examiner* — Kwang B Yao
*Assistant Examiner* — Juvena Loo
(74) *Attorney, Agent, or Firm* — Fish & Richardson P.C.

(57) ABSTRACT

Methods, systems, and apparatus are described for network encapsulation and routing. In one aspect, a method includes receiving, from source network and at an edge device a first network packet including a first inner header including i) a first source address, and ii) a first destination address; selecting a source network identifier for the source network from a plurality of routable network identifiers; encapsulating the first network packet within a first encapsulation packet; routing the first encapsulation packet to the destination server; receiving, from the destination server, a second encapsulation packet; extracting the second network packet from the second encapsulation packet; and routing the second network packet to the source network.

19 Claims, 5 Drawing Sheets

(56) References Cited

U.S. PATENT DOCUMENTS

| | | | |
|---|---|---|---|
| 2002/0069292 A1* | 6/2002 | Gaddis | H04M 15/00 709/238 |
| 2003/0195973 A1* | 10/2003 | Savarda | H04L 63/164 709/230 |
| 2004/0001508 A1 | 1/2004 | Zheng | |
| 2004/0264458 A1* | 12/2004 | Six | H04L 12/18 370/389 |
| 2006/0259639 A1* | 11/2006 | Aken | H04L 12/4633 709/245 |
| 2012/0008528 A1 | 1/2012 | Dunbar | |
| 2012/0230336 A1* | 9/2012 | Nishiyama | H04L 45/741 370/392 |
| 2013/0080612 A1 | 3/2013 | Armstrong | |
| 2015/0055507 A1* | 2/2015 | Korhonen | H04L 12/4633 370/254 |
| 2016/0028604 A1* | 1/2016 | Chakrabarti | H04L 43/0852 370/252 |

OTHER PUBLICATIONS

M. Borella et al., "Realm Specific IP: Framework" [online], (retrieved on Jan. 21, 2014). Retrieved from the Internet: http://tools.ietf.org/html/rfc3102, 30 pages.

M. Borella et al., Realm Specific IP: Protocol Specification <draft-ietf-nat-rsip-protocol-06.txt> [online], (retrieved on Jan. 21, 2014), Retrieved from the Internet: http://tools.ietf.org/html/draft-ietf-nat-rsip-protocol-06, 48 pages.

O. Troan et al., "Mapping of Address and Port with Encapsulation (MAP) draft-ietf-softwire-map-08" [online], (retrieved on Jan. 21, 2014). Retrieved from the Internet: http://tools.ietf.org/html/draft-ietf-softwire-map-08, 30 pages.

Cisco, "Locator/ID Separation Protocol (LISP)" [online], (retrieved on Jan. 21, 2014). Retrieved from the Internet: http://www.cisco.com/en/US/prod/collateral/iosswrel/ps6537/ps6554/ps6599/ps10800/qa_c67-582925.html, 5 pagesCisco, "Locator/ID Separation Protocol (LISP)" [online], (retrieved on Jan. 21, 2014). Retrieved from the Internet: http://www.cisco.com/en/US/prod/collateral/iosswrel/ps6537/ps6554/ps6599/ps10800/qa_c67-582925.html, 5 pages.

D. Farinacci, "The Locator/ID Separation Protocol (LISP)" [online], (retrieved on Jan. 21, 2014). Retrieved from the Internet: http://tools.ietf.org/html/rfc6830, 75 pages.

W. Simpson "IP in IP Tunneling" [online], (retrieved on Jan. 21, 2014). Retrieved from the Internet: http://tools.ietf.org/html/rfc1853, 1 page.

YouTube "IP-in-IP Encapsulation Example" [online], (retrieved on Jan. 21, 2014). Retrieved from the Internet: http://www.youtube.com/watch?v=Onnk44E8zO8, 2 pages.

Juniper Networks "Understanding Generic Routing Encapsulation" [online], (retrieved on Jan. 21, 2014). Retrieved from the Internet: http://www.juniper.net/techpubs/en_US/junos12.1/topics/concept/gre-tunnel-services.html, 2 pages.

How to configure a GRE tunnel [online], (retrieved on Jan. 21, 2014). Retrieved from the Internet: https://supportforums.cisco.com/docs/DOC-2569, 4 pages.

Petri, "Private IP Encapsulation within IP (PIPE); draft-petri-mobileip-pipe-O0.txt," Jan. 20, 2000.

Touch et al., "Tunnels in the Internet Architecture; draft-touch-intarea-tunnels-00.txt," Jul. 7, 2008.

International Search Report and Written Opinion in International Application No. PCT/US2015/032232, mailed Sep. 9, 2015, 12 pages.

* cited by examiner

NETWORK PACKET ENCAPSULATION AND ROUTING

BACKGROUND

This specification relates to network packet encapsulation and routing.

Communication between networked devices often requires network addresses, such as internet protocol (IP) addresses, to identify senders and recipients of data across a network. In some networks, such as an IPv4 network, IP addresses may often overlap and/or be outnumbered by the devices connecting to the networks. To provide common network services, such as a web server providing web based services to a number of different source networks, one solution to address potential overlap in IP addresses is a network address translation (NAT) system. A NAT system allows clients behind source networks to communicate with server devices by translating IP addresses of the clients into a global address that the server devices can communicate with. NAT devices are typically single devices that require complex internals for supporting a large amount of address translation state while synchronizing with peer NAT devices.

SUMMARY

This specification describes technologies relating to encapsulating and routing network packets.

In general, one innovative aspect of the subject matter described in this specification can be embodied in methods that include the actions of receiving, from source network and at an edge device external to the source network and within a second network, a first network packet, the first network packet including a first inner header, the first inner header including i) a first source address specifying a user device included in the source network from which the first network packet originated, and ii) a first destination address specifying a destination server to which the first network packet is addressed; selecting a source network identifier for the source network from a plurality of routable network identifiers, the source network identifier being different from the source address; encapsulating the first network packet within a first encapsulation packet, the first encapsulation packet including a first outer header, the first outer header including i) a first outer source address specifying the source network identifier, and ii) a first outer destination address that is the first destination address; routing the first encapsulation packet to the destination server within the second network; receiving, from the destination server, a second encapsulation packet, the second encapsulation packet including a second network packet that includes a second outer header, the second outer header including i) a second outer source address that is the first destination address specifying the destination server from which the second encapsulation packet originated, and ii) a second destination address specifying the source network identifier to which the second encapsulation packet is addressed; extracting the second network packet from the second encapsulation packet, the second network packet including a second inner header, the second inner header including i) a second source address that is the first destination address, and ii) a second destination address that is the first source address; and routing the second network packet to the source network. Other embodiments of this aspect include corresponding systems, apparatus, and computer programs, configured to perform the actions of the methods, encoded on computer storage devices.

These and other embodiments can each optionally include one or more of the following features. Encapsulating the first network packet within the first encapsulation packet may include using IP in IP encapsulation to encapsulate the first network packet. Encapsulating the first network packet within the first encapsulation packet may include using Generic Routing Encapsulation to encapsulate the first network packet.

The first outer header of the first encapsulation packet may include a packet protocol field, and encapsulating the first network packet within a first encapsulation packet may include specifying a value for the packet protocol field that indicates that the first encapsulation packet encapsulates the first network packet.

Routing the first encapsulation packet to the destination server may include providing the first encapsulation packet to a network load balancer within the second network.

The edge device may be one of a plurality of edge devices within the second network, and the method may further comprise: broadcasting, to the second network, a reachability indicator that specifies that the edge device is in communication with the source network.

The edge device may have an edge device identifier that uniquely identifies the edge device within the second network, and the source network identifier selected for the source network may be different from the edge device identifier.

The source network may be one of a plurality of source networks in communication with the edge device, a source network identifier may be selected for each of the plurality of source networks, and the source network identifier for each source network in the plurality of source networks may be different from each other source network identifier selected for the plurality of source networks in communication with the edge device.

The edge device may be one of a plurality of edge devices within the second network, and the method may further comprise: broadcasting, to the second network, a reachability indicator that specifies that the edge device is in communication with the plurality of source networks.

Another innovative aspect of the subject matter described in this specification can be embodied in methods that include the actions of receiving, by a data processing apparatus and from an edge device, a first encapsulation packet; determining, based on a packet protocol field included in the first encapsulation packet, that the first encapsulation packet encapsulates a first network packet, and in response to the determination: identifying a first outer source address included in a first outer header of the first encapsulation packet, the first outer source address specifying a source network from which the first network packet originated; recording the first outer source address in a network connection table; extracting the first network packet from the first encapsulation packet, the first network packet including a first inner header, the first inner header including i) a first source address specifying a user device from which the first network packet originated, and ii) a first destination address specifying the data processing apparatus to which the first network packet is addressed; processing the first network packet; generating a second network packet, the second network packet including a second inner header, the second inner header including i) a second source address that is the first destination address that specifies the data processing apparatus, and ii) a second destination address that is the first source address to which the second network packet is addressed; obtaining the first outer source address from the network connection table; encapsulating the second network packet within a second encapsulation packet, the second encapsulation packet including the second network packet that includes a second outer header, the second outer header including i) a second outer source address that is the first destination address that specifies the data processing apparatus, and ii) an outer destination address that is the first outer source address to which the second encapsulation packet is addressed; routing the second encapsulation packet to the source network specified by the first outer source address. Other embodiments of this aspect include corresponding systems, apparatus, and computer programs, configured to perform the actions of the methods, encoded on computer storage devices.

These and other embodiments can each optionally include one or more of the following features. The method may further comprise: receiving, by the data processing apparatus and from a network device, a third network packet; determining, based on a packet protocol field included in the third network packet, that the third network packet does not encapsulate another network packet; and processing the third network packet.

The data processing apparatus and the edge device may be within a second network that is separate from source network from which the first network packet originated.

Particular embodiments of the subject matter described in this specification can be implemented so as to realize one or more of the following advantages. User devices on source networks may communicate with servers or other devices on a common network in a manner that avoids conflicts in network addresses and without the infrastructure cost of carrier grade NAT devices. In addition, the support of failover and redundancy using multiple edge devices allows for transparent failover, without the need for state synchronization between devices, in situations where a network device loses connectivity, preventing interruptions in network communications.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A network device facilitates the routing of network packets from a source network to a public server device, and from the public server device to the source network device. For example, network packet received from a user device can be encapsulated and routed to a server device that will process the encapsulated network packet and respond with another encapsulated packet that can be routed back to the user device. The routing may be performed across a common network using globally unique internet protocol addresses without requiring stateful network address translation (NAT) devices.

A user device on a source network may communicate with a public server device that is part of a common network by sending internet protocol (IP) packets. IP packets generally include a header and a payload. The header specifies metadata, such as a source address, a destination address, and other metadata for routing and delivering the packet, and the payload includes data intended for the destination device. Source networks often include routing devices that will receive the packets sent from user devices connected to the routing device, and the routing devices forward route the packets to their specified destination. Routing devices may also be responsible for routing incoming IP packets to the proper destination user devices.

An edge device, such as a router, resides within a common network that includes a destination device, such as a web-server, and receives network packets that originated from a user device on a source network. The header of each packet includes a source address specifying the user device as the source of the packet and a destination address specifying the destination device as the destination. For each received packet, the edge device selects a routable network identifier, such as a globally unique IP address, for the packet and encapsulates the packet, e.g., using IP in IP or GRE encapsulation. The outer packet includes an outer header that specifies the routable network identifier as the source address of the packet, and uses the same destination address to specify the destination device to which the packet is addressed.

The edge device routes the encapsulation packet to the destination device. The encapsulation packet may be provided directly to the destination device, or it may be provided to one or more other devices within the second network, such as a load balancer and/or another router, before ultimately arriving at the destination device.

The destination device receives the encapsulation packet and determines that it encapsulates the first network packet. The determination may be made, for example, based on a packet protocol field included in the header of encapsulation packet. Based on the determination the received packet encapsulates another packet, the destination device identifies the source of the encapsulation packet and records the address of the source in a network connection table. For example, the outer header of the encapsulation packet specifies the routable network identifier as the source address of the packet, so the destination device records the routable network identifier in its network connection table.

The destination device then extracts the first network packet from the encapsulation packet for processing. For example, after removing the outer header of the encapsulation packet, the inner packet, which includes the source address of the user device from which the packet originated, can be processed as the destination device would process a standard network packet.

When the destination device responds to the first network packet, it generates a response packet including a destination address that is the address of the user device, and a source address that is the address of the destination device. The destination device may then check the network connection table to find the routable network identifier that corresponds to the user device, and encapsulate the response packet within a second encapsulation packet. The second encapsulation packet includes a destination address that is the routable network identifier, and a source address that is the address of the destination device. The destination device then routes the second encapsulation packet to the source network.

An edge device receives the second encapsulation packet, directly or indirectly, from the destination device. The edge device may be the same as the edge device used to provide the first encapsulation packet to the destination device, or it may be a different edge device. The edge device extracts the response packet from the second encapsulation packet, and routes the response packet to the source network identified by the identifier included as the destination of the second encapsulation packet.

Figure 1:
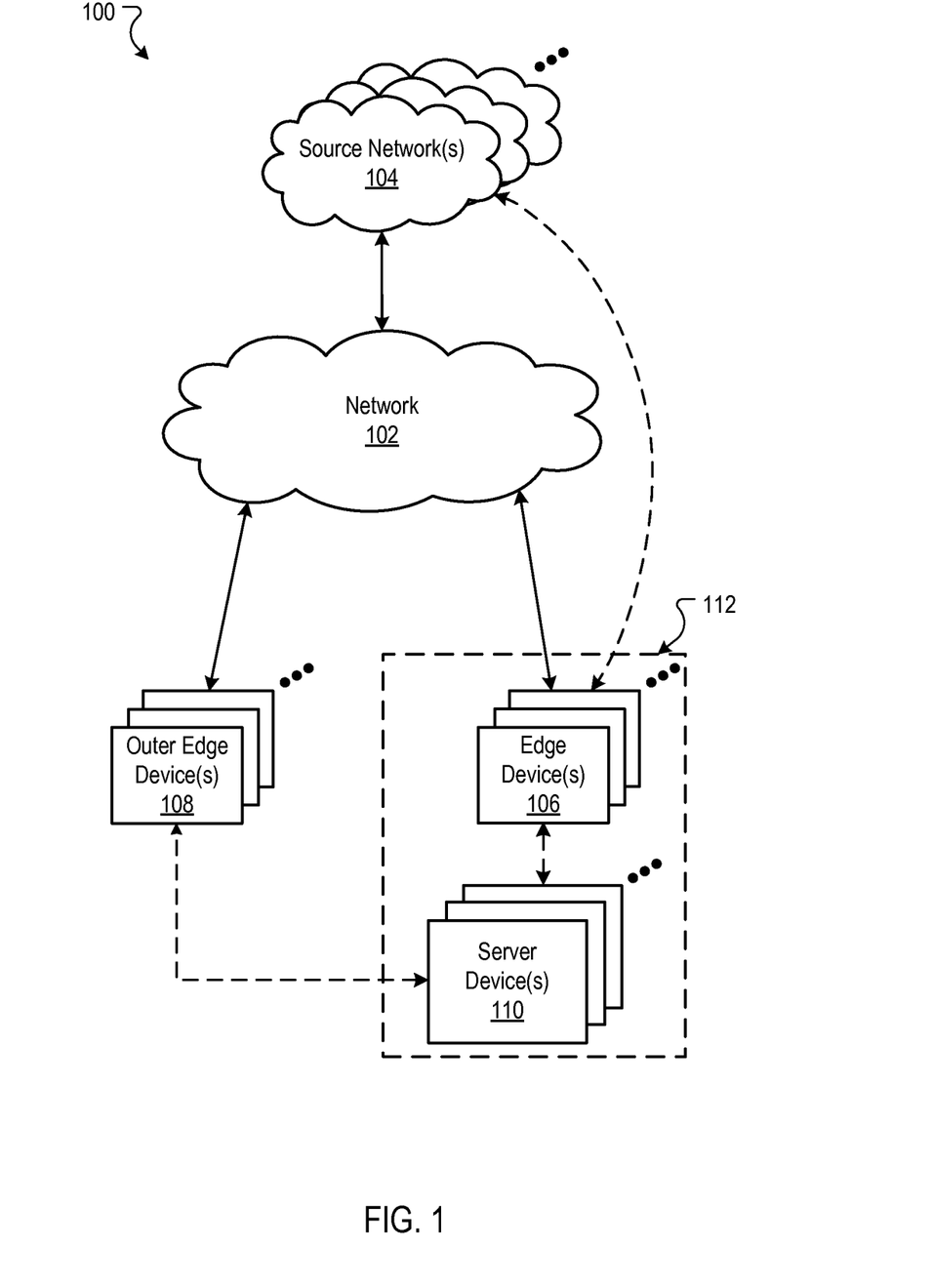
FIG. 1 is a block diagram of an example environment in which network packets are encapsulated and routed.

FIG. 1 is a block diagram of an example environment 100 in which network packets are encapsulated and routed. A computer network 102, such as a local area network (LAN), wide area network (WAN), the Internet, or a combination thereof, connects one or more source networks 104 (e.g., a private LAN or WAN), one or more edge devices 106, one or more outer edge devices 108, and one or more server devices 110. In the example environment, the edge devices 106 and server devices 110 operate within a second network 112, such as a second LAN or WAN that is separate from the computer network 102 and source network(s) 104.

Source networks 104 include, for example, home networks, business networks, and cloud computing networks, each including at least one network device for communicating outside of the source network, such as a modem or router. A home network may, for example, may include user devices, such as desktop and laptop personal computers, tablet computers, and/or smart phones connected to a home router and/or modem device. As another example, a business network may include many user devices, such as personal computers and server computers that are connected in a WAN via routers and/or modem devices. A cloud computing network is another type of personal network that may, for example, include user devices in the form of cloud computing servers or instances of virtual machines on one or more cloud computing server computers, where each cloud server includes or is connected to a modem and/or router for network communication purposes.

Devices included in source networks 104 communicate with other devices, such as devices connected to other source networks and devices connected to the computer network 102. Communication between devices and networks may be performed by sending network packets between devices. A network packet is data formatted for transmission by a packet-switched network. Network packets include a control data, e.g., a header that specifies information about the network packet, such as a source of the packet, a destination, a packet protocol, and other types of information. Network packets also include payload data, e.g., data intended for processing by a recipient device. Example network packets include IPv4 network packets using, for example, TCP, UDP, and/or ICMP packet protocols.

Edge devices 106 and outer edge devices 108 receive network packets from a networked device and route the packets to a destination network device. Edge devices 106 and outer edge devices 108 include, for example, network routers that receive and route network packets based on information contained in network packet headers. Edge devices 106 are within the second network 112 and receive network packets sent, for example, from source router devices, and route the network packets to the server devices 110 within the second network 112. Outer edge devices 108 are not within the second network 112, and may, in some implementations, also route network packets to the server devices 110. Outer edge devices 108 may also route network packets to other devices that are not included in the second network 112.

Server devices 110 include server computers that receive, process, and respond to network packets provided by the edge devices 106 and outer edge devices 108. Server devices include, for example, web servers that host websites, cloud storage servers that provide cloud storage management solutions, and distributed processing system servers that are used to process large amounts of data. Many other types of server devices 110 may be included in a second network 112.

Many user devices, source networks, outer edge devices, and second networks, may exist and may communicate with one another using the computer network 102. To enable communication between devices using a computer network 102, such as an IPv4 network, each device that communicates using the network has a network address, e.g., an IP address that is used to communicate with other networked devices. Each network device's network address identifies the location of the network device on the network. Network addresses are finite in number, and in situations where network addresses are not uniquely assigned to network devices—e.g., when more network devices exist than available network addresses—conflicts in network addressing can cause problems, such as data loss and communication interruptions. The network encapsulation and routing techniques described herein facilitate communication between networked devices in a manner designed to avoid conflicts in network addresses.

By way of example, IP addresses of user devices within a source network may be assigned by a network router. The IP addresses of devices within the source network are unique within the source network, but not necessarily globally unique (e.g., not unique with respect to other devices connected to the Internet). A user device sends a network packet to the source network router, and the source network router, which also has an IP address, forwards the network packet to a destination server device specified by the network packet, such as a webserver that hosts a website. The path taken by a network packet across the Internet varies and may include, for example, routing through Internet Service Provider devices, a Domain Name Server (DNS), a load balancer, and other network devices that comprise the Internet's "backbone." In some implementations, the source network router may have a direct connection or predetermined path to an edge device 106, obviating the need for network packets to traverse the backbone of the Internet. For example, a cloud computing network affiliated with the second network 112 may be provided with a direct connection or predetermined route to connect to the edge devices 106 of the second network 112.

The network packet sent from the source network router arrives at an edge device that routes network traffic that enters the second network 112 and that is destined for one of the server devices 110. The received network packet includes a header that identifies the source network router's IP address as the source of the packet and the destination server IP address (e.g., one of the server devices 110) as the destination for the packet. The source address, e.g., the private router's IP address, may not be unique, and the edge device selects a source network identifier to uniquely identify the source network, and marks the network packet with the source network identifier, e.g., using GRE or IPIP encapsulation, before forwarding the network packet to the destination server device.

The destination server device receives the marked or encapsulated network packet, identifies it as an encapsulated packet, records the source network identifier in a network connection table, and extracts and processes the inner network packet. When responding to the user device, the server device creates a network packet using the inner source address, e.g., the IP address of the user device, as the destination for the packet. The server device then encapsulates the network packet within a second packet, using the source network identifier, e.g., from the connection table, as the destination in the header of the second packet. The packet is then forwarded to the edge device for delivery to the user device.

When the edge device receives the encapsulated packet from the destination server, it identifies the source network identifier as the destination specified by the outer header, removes the outer header from the inner network packet, and forwards the inner network packet to the source network router of the source network identified by the source network identifier. The source network router then sends the network packet to the user device for processing.

Figure 2:
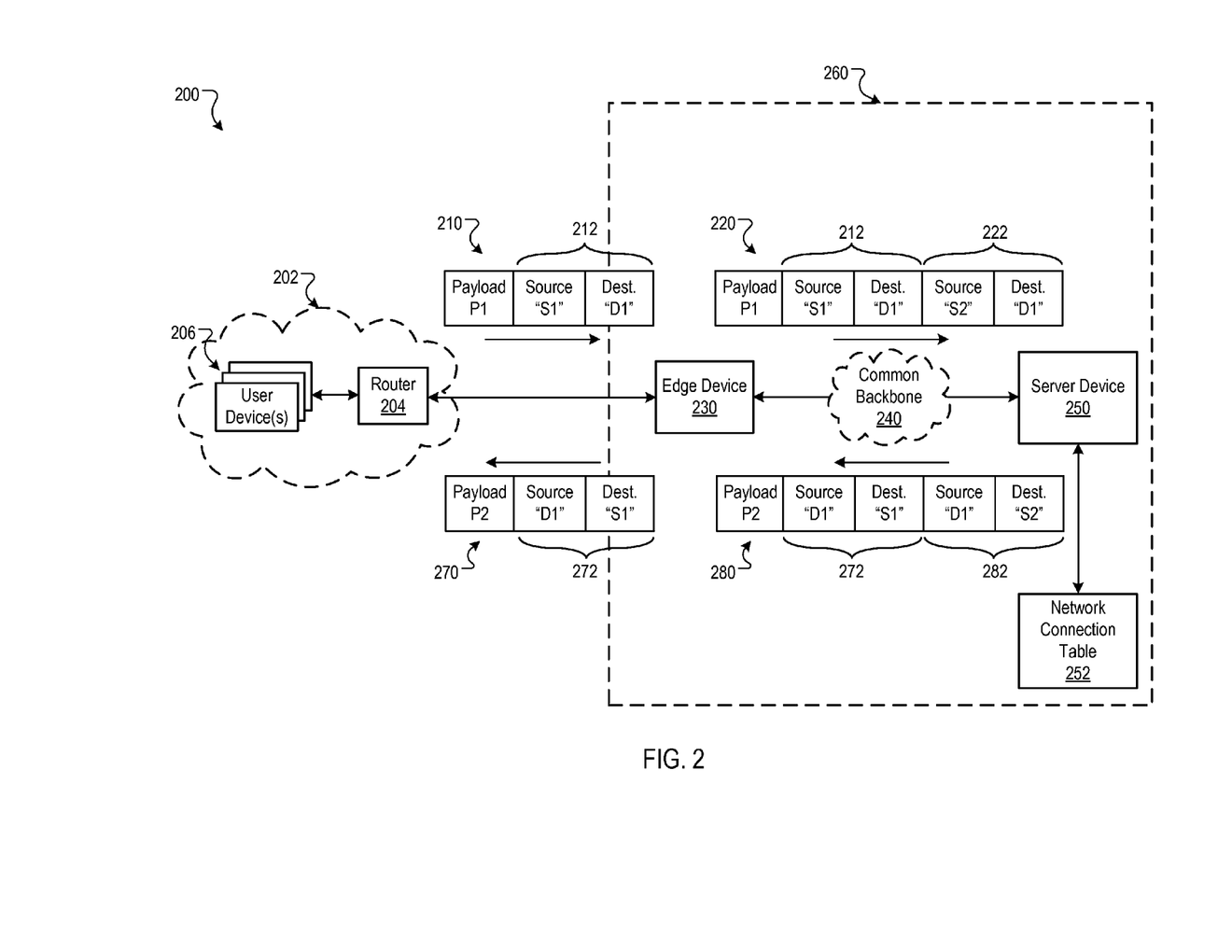
FIG. 2 is an illustration of an example process for encapsulating and routing a network packet.

FIG. 2 is an illustration of an example process 200 for encapsulating and routing a network packet. A source network 202 includes a router 204 and user devices 206. While the example source network includes one router 204 and three user devices 206, any number of routers and user devices may be included in a source network 202, and the router 204, which may be implemented in hardware or software, can be included in one or more user devices 206.

For ingress packets sent from the source network 202, a network packet 210 is sent from the source network 202 to an edge device 230 at the edge of a common network 260. The network packet 210 originates from one of the user devices 206 and/or the source network router 204 and it includes a payload, P1, and a header 212 that specifies a source address, S1, and a destination address, D1. For example, S1 may be an IP address of the source network router 204, while D1 may be the IP address of the server device 250 to which the network packet 210 is addressed.

The edge device 230, which exists within the common network 260, receives the network packet 210 and selects a source network identifier, e.g., S2, for the source network 202. The source network identifier may, for example, be selected based on a list of identifiers that the edge device 230 knows to be unique. It may be another IP address, or another type of identifier unique to the common network 260. In some implementations, the edge device 230 may also have a network identifier that uniquely identifies the edge device 230 on the common network 260, and any source network identifier(s) selected by the edge device 230 is also different from the network identifier of the edge device 230. In the example process 200, the identifier S2 thus uniquely identifies the source network 202.

In addition, while only one source network 202 and one edge device 230 are depicted in the example process 200, multiple source networks may be connected to the edge device 230, and multiple edge devices may be used in the common network 260, each of which may be connected to any number of other source networks. Each source network identifier may be chosen dynamically, e.g., from a pool of available identifiers that changes, based on availability, over time. During a communications session, the source network identifier and edge device used to communicate with the second network may remain the same; however, during a separate communications session, the same source network may connect to the same or a different edge device and be assigned the same source network identifier or a different source network identifier for that communications session.

The edge device 230 marks the network packet 210 with the source network identifier, S2. In the example process 200, the edge device 230 encapsulates the packet to form a first encapsulation packet 220. Multiple methods may be used to mark the network packet 210, such as Generic Routing Encapsulation (GRE) or Internet Protocol within Internet Protocol (IPIP) Encapsulation. The first encapsulation packet 220 is an example of IPIP encapsulation, where a new header 222 is appended to the network packet 210 to create the first encapsulation packet 220. The new header 222 includes the same destination address, D1, as the first encapsulation packet 220 is still destined for the server device 250. The source address of the new header 222, S2, is the source network identifier selected by the edge device 230. In some implementations, the new header 222 also includes a packet protocol field that includes a value that specifies a packet protocol. The value may also indicate that the new header 222 is for an encapsulated packet.

In some implementations, the source network 202 to edge device 230 interconnect runs a standard routing protocol to advertise reachability between the networks. In some implementations, static routes may be created at the edge of the common network. For example, a standard border gateway protocol (BGP) session may be established between the source network router 204 and the edge device 230. The edge device 230 may then advertise, or broadcast, the source network identifiers, e.g., virtual IP addresses, that are reachable through it to the source network 202. The source network router 204 may advertise its connectivity to the source network 202, e.g., by advertising a summary to the source network 202. The edge device 230 may also be configured so that, in response to receiving a route to the source network 202, it will in turn advertise the source network identifier of the source network 202 into the common backbone 240 of the common network 260 so that other devices on the common network 260, including other edge devices, are aware of the source network identifier and the edge device(s) through which the source network may be reached.

In some implementations, methods for introducing redundancies and failover support may also be implemented. For example, the source network 202 may broadcast a reachability indicator to the edge device 230. The indicator may be a summary of the source networks, or may be another route. It may be implemented, for example, in BGP, which provides an implementation for advertising routes. The edge device 230 would, upon receipt of the reachability indicator, advertise the source network 202 into the common backbone 240 of the common network 260. In this situation, multiple edge devices may be advertising the same source network identifiers, providing redundancy in case of a failure of either a common network 260 device or source network 202 device.

The edge device 230 routes the first encapsulation packet 220 to the server device 250. In some implementations, as in the example process 200, the first encapsulated packet 220 is forwarded to one or more devices that make up the common backbone 240 of the common network 260. These devices include, for example, load balancers, packet processing engines, and routers, and they may perform any necessary lookup/re-encapsulation processes and, ultimately, forward the first encapsulation packet 220 to the server device 250.

The server device 250 determines, based on a packet protocol field included in the new header 222 of the first encapsulation packet 220, that the first encapsulation packet 222 encapsulates another packet. Based on this determination, the server device 250 records the source address of the new header 222, e.g., the source network identifier, S2, in its network connection table 252. The network connection table 252 includes data used by the server device, such as IP address information, network identifiers, ports, protocols, etc., for managing network communications with various network devices.

The server device 250 extracts the first network packet 210 from the first encapsulation packet 220. Depending on the type of encapsulation or other method of marking used, different methods may be used to extract the first network packet. When using IPIP encapsulation for example, the outer header, e.g., new header 222, may either be ignored or discarded. After extracting the first network packet 210, the server device 250 treats the packet like a standard network packet received for processing, e.g., through its normal kernel pipeline.

When responding with a return/egress packet, the server device 250 generates a response packet 270 that includes a payload, P2, and a header 272 that specifies the destination of the response packet as the address of the user device and/or source network router from which the first network packet 210 originated. In other words, the source of the first network packet, S1, is the destination of the response packet 270. The source of the response packet 270, D1, is the address of the server device 250.

After generating a response packet 270, the server device 250 obtains the source network identifier from the network connection table 252, and marks the response packet with the source network identifier, e.g., by encapsulating the response packet in a second encapsulation packet 280. In the example process 200, the second encapsulation packet 280 includes an outer header 282, which specifies the source network identifier, S2, as the destination, and the address of the server device 250, D1, as the source. After encapsulating the response packet 270, the server device 250 routes the second encapsulation packet 280 to the source network 202, e.g., through the common backbone 240 and through the edge device 230, or through a different edge device included in the common network 260.

In some implementations, the server device 250 is also capable of communicating with devices have not been subject to the routing and encapsulation processes described above. For example, a source network that communicates with the server device 250 and is not affiliated with an edge device of the common network 260, e.g., a non-affiliated source network communicating using the Internet, may communicate with the server device without the need for extracting and encapsulating network packets. In this situation, the server device 250 may receive a network packet from a network device that is not within the common network 260; determine, based on the packet protocol field of the network packet, that the network packet is not an encapsulation packet; and process the network packet normally. Responses to these network packets, for example, need not be encapsulated or routed through the common backbone 240 of the common network 260.

The edge device 230, or in some implementations another edge device to which the source network identifier has been advertised, receives the second encapsulation packet 280 that was sent from the server device 250. The edge device 230 extracts the response packet 270 from the second encapsulation packet 280, e.g., by removing the outer header 282. The edge device 230 then routes the response packet 270 to the source network 202. In the example process 200, the source network router 204 receives the response packet 270, and can process the packet normally, e.g., by forwarding the packet to the appropriate user device within the source network 202.

While the example process 200 depicts a single source network, edge device and server device, the routing and encapsulation techniques described above may be used in many other network configurations. As noted above, the common network 260 may include many edge devices and server devices. In some implementations, edge devices may communicate directly with server devices, e.g., without routing network packets through the common backbone 210. Source networks may, in some implementations, require affiliation with the common network 260 to be eligible for communicating with the common network using the methods described above, e.g., by requiring that source networks be cloud computing networks directly connected to the common network.

Figure 3:
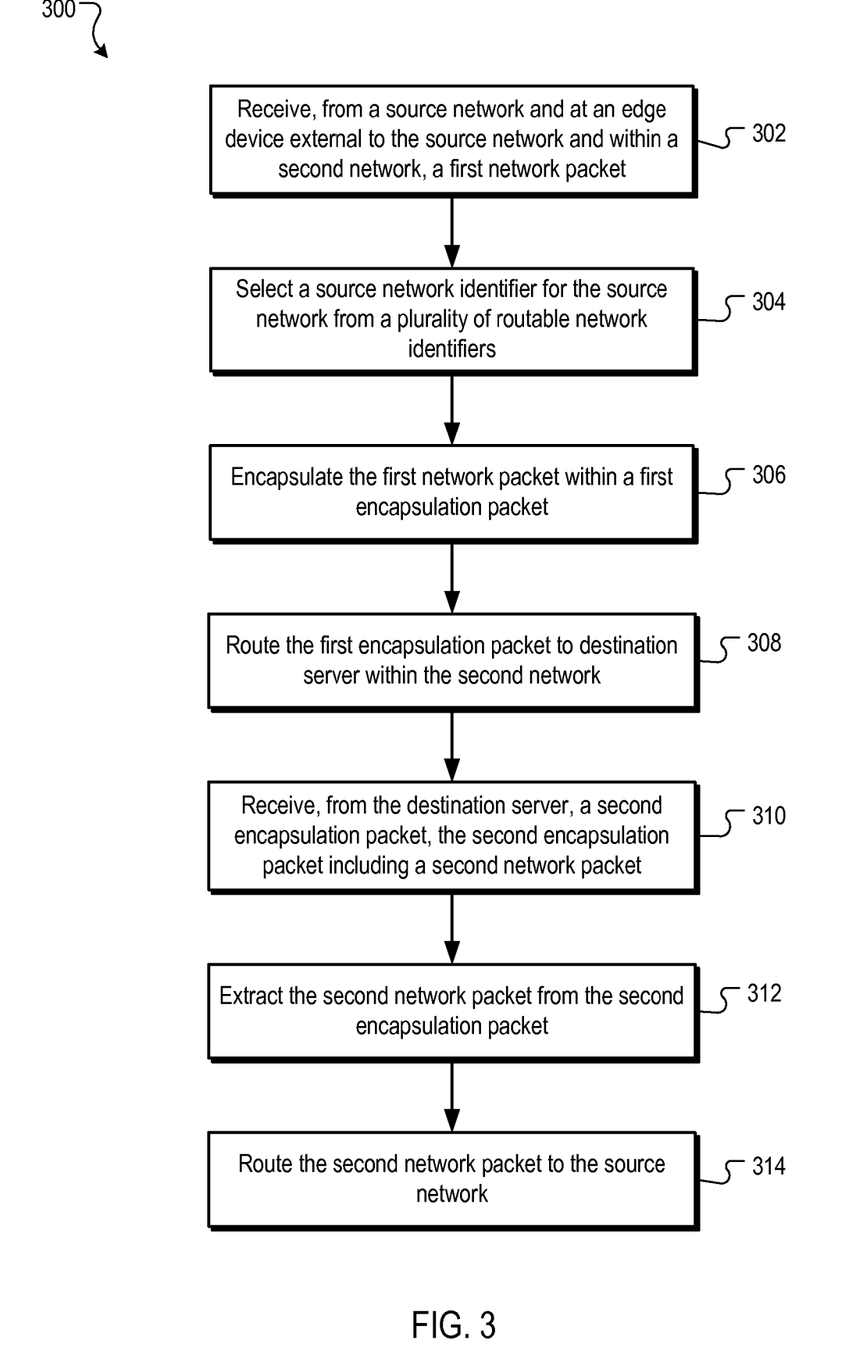
FIG. 3 is a flow diagram of an example process in which a network packet is encapsulated and routed.

FIG. 3 is a flow diagram of an example process 300 in which a network packet is encapsulated and routed. The example process 300 may be implemented by data processing apparatus, such as an edge device.

A first network packet is received from a source network and at an edge device external to the source network and within a second network (302). The first network packet includes a first inner header, and the first inner header includes i) a first source address specifying a user device included in the source network from which the first network packet originated, and ii) a first destination address specifying a destination server to which the first network packet is addressed. For example, an edge device may receive a network protocol packet from a source network, and the header specifies an IP address of the user device on the source network that sent the packet, while the destination address specifies an IP address of a destination server device that is located on the second network.

A source network identifier is selected for the source network from a plurality of routable network identifiers (304). The source network identifier is different from the source address. In some implementations, the routable network identifier need only be routable within the second network. For example, an edge device may have a set of character strings known to be unique on the second network, and one of those unique character strings may be selected as the source network identifier for the source network. In some implementations, the edge device has an edge device identifier that uniquely identifies the edge device within the second network, and the source network identifier selected for the source network is different from the edge device identifier. In an example using IP addresses as network identifiers, the source network identifier may be an IP address unique to the second network, e.g., not the same as the IP address of the edge device.

In some implementations, the source network is one of multiple source networks in communication with the edge device. Source network identifiers are selected for each of the source networks, and each source network identifier is different from each other source network identifier selected for the source networks in communication with the edge device. For example, an edge device that is connected to 10 different source networks may have 10 a different IP address assigned to each of them. The IP addresses may uniquely identify the corresponding source networks within the second network.

The first network packet is encapsulated within a first encapsulation packet (306). The first encapsulation packet includes a first outer header, and the first outer header includes i) a first outer source address specifying the source network identifier, and ii) a first outer destination address that is the first destination address. In some implementations, IPIP encapsulation is used to encapsulate the first network packet within the first encapsulation packet. In some implementations, GRE is used to encapsulate the first network packet within the first encapsulation packet. By way of example, the first network packet may be prepended with an outer header that specifies the same destination address as the first network packet, but includes the source network identifier as the source.

In some implementations, the first outer header of the first encapsulation packet includes a packet protocol field, and encapsulating the first network packet within the first encapsulation packet includes specifying a value for the packet protocol field that indicates that the first encapsulation packet encapsulates the first network packet. For example, a predetermined string of characters may be placed in the packet protocol field of the outer header, which would indicate to a device reading the header that the packet is an encapsulation packet.

The first encapsulation packet is routed to the destination server within the second network (308). In some implementations, a common backbone for the second network, which may include multiple network devices, may be used to route the packet from the edge device to the destination server. For example, the first encapsulation packet may be provided to a network load balancer within the second network. The network load balancer may determine how the packet should be routed to the destination server.

A second encapsulation packet is received from the from the destination server, the second encapsulation packet including a second network packet (310). The second network packet includes a second outer header, and the second outer header includes i) a second outer source address that is the first destination address specifying the destination server from which the second encapsulation packet originated, and ii) a second destination address specifying the source network identifier to which the second encapsulation packet is addressed. For example, the second encapsulation packet received by the edge device was sent by the destination server to which the first encapsulation packet was addressed. The second encapsulation packet is addressed to the source network identifier that was specified as the source address in the outer header of the first encapsulation packet.

The second network packet is extracted from the second encapsulation packet (312). The second network packet includes a second inner header, and the second inner header includes i) a second source address that is the first destination address, and ii) a second destination address that is the first source address. For example, the inner packet is addressed to the user device from which the original network packet was received.

The second network packet is routed to the source network (314). For example, the edge device forwards the second network packet to a router included in the source network, and the router forwards the second network packet to a personal computer or other user device from which the first network packet originated.

Figure 4:
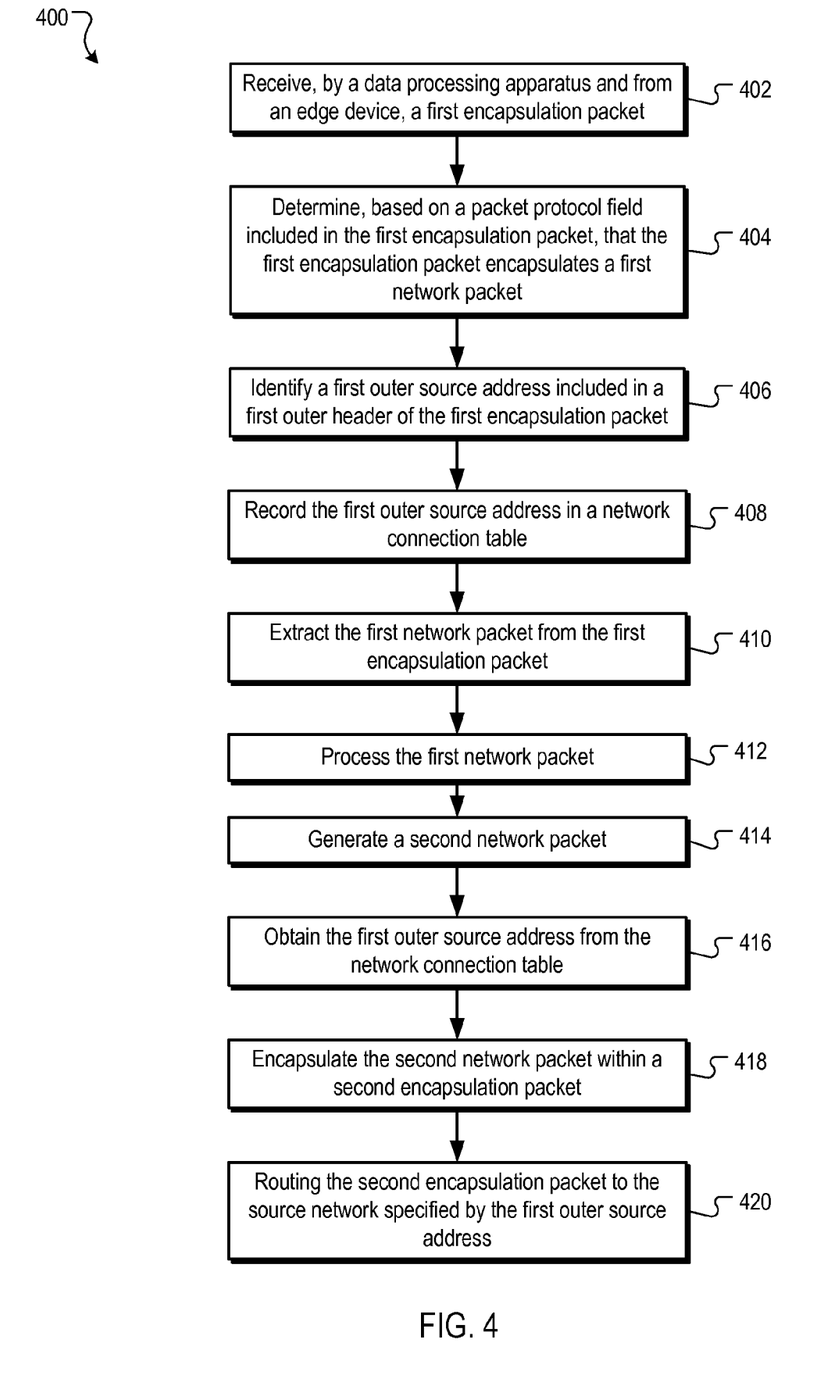
FIG. 4 is a flow diagram of an example process in which a destination device operates using network packet encapsulation.

FIG. 4 is a flow diagram of an example process 400 in which a destination device operates using network packet encapsulation. The example process 400 may be implemented by data processing apparatus, such as a server device.

A first encapsulation packet is received by a data processing apparatus and from an edge device (402). In some implementations, the edge device and the data processing apparatus are part of a common network that is separate from one or more outer networks. For example, both an edge device and a server device may be part of a LAN that is connected to external networks, such as the Internet and/or source networks.

Based on a packet protocol field included in the first encapsulation packet, the process 400 determines that the first encapsulation packet encapsulates a first network packet (404). In some implementations, the data processing apparatus may not be aware, prior to examining the packet protocol field, that the received packet encapsulates another packet. The packet protocol field may, for example, include a value that specifies that the received packet is an encapsulation packet.

In response to the determination that the first encapsulation packet encapsulates a first network packet, a first outer source address included in a first outer header of the first encapsulation packet is identified (406). The first outer source address specifies a source network from which the first network packet originated.

The first outer source address is recorded in a network connection table (408). For example, the server device that received the first encapsulation packet records the first outer source address, and any other data relevant to establishing communication with the source network from which the packet originated, in its connection table.

The first network packet is extracted from the first encapsulation packet (410). The first network packet includes a first inner header, and the first inner header includes i) a first source address specifying a user device from which the first network packet originated, and ii) a first destination address specifying the data processing apparatus to which the first network packet is addressed. For example, the first source address may be an IP address of a personal computer and/or router of a source network, and the first destination address may specify the IP address of the server device.

The first network packet is processed (412). The server device may use its standard processing methods to process the first packet. For example, if a payload include in the packet requests content from the server device, the server device may locate the requested content, e.g., on one or more storage devices connected to the server device, and prepare the content for transmittal to the requesting user device.

A second network packet is generated (414). The second network packet includes a second inner header, and the second inner header includes i) a second source address that is the first destination address that specifies the data processing apparatus, and ii) a second destination address that is the first source address to which the second network packet is addressed. For example, the second source address may be the IP address of the server device, and the second destination address may be the IP address of the user device.

The first outer source address is obtained from the network connection table (416). For example, the server device may retrieve, e.g., from local storage, data necessary for responding to the first network packet, which includes the identifier of the source network from which the first network packet originated.

The second network packet is encapsulated within a second encapsulation packet (418). The second encapsulation packet includes the second network packet and a second outer header that includes i) a second outer source address that is the first destination address that specifies the data processing apparatus, and ii) an outer destination address that is the first outer source address to which the second encapsulation packet is addressed. For example, the server device may use IPIP encapsulation to create an outer header for the second network packet, and the outer header specifies the source network identifier as its destination and the IP address server device as the source.

The second encapsulation packet is routed to the source network specified by the first outer source address (420). For example, the server device may forward the second encapsulation packet, directly or indirectly, to the edge device from which the first encapsulation packet was received, and the edge device can remove the inner packet and forward the inner packet to the appropriate source network. In some implementations, the edge device and the data processing apparatus are within a second network that is separate from the source network from which the first network packet originated.

In some implementations, the edge device is one of multiple edge devices within the second network that includes the server device, and a reachability indicator is broadcast to the second network specifying that the edge device is in communication with the source network. For example, an edge device may advertise, e.g., to the backbone of the second network and/or to other edge devices in the second network, the source network(s) with which the edge device is in communication. Advertisement of lines of communication between edge devices and source networks may facilitate the routing of communications through the second network while also providing edge device failure protection by enabling other edge devices to take over for edge devices that may have failed.

In some implementations, the data processing apparatus receives, from a network device, a third network packet. For example, the network device may be a network router that is external to a common network in which the server device and edge device exist. Based on a packet protocol field included in the third network packet, it may be determined that the third network packet does not encapsulate another network packet. In response to making that determination, the server device may process the third network packet, for example, using standard network routing methods. In this implementation, for example, the server device is capable of receiving encapsulated network packets and standard network packets, determining which type of network packet is received, and responding appropriately depending on the type of network packet received.

Figure 5:
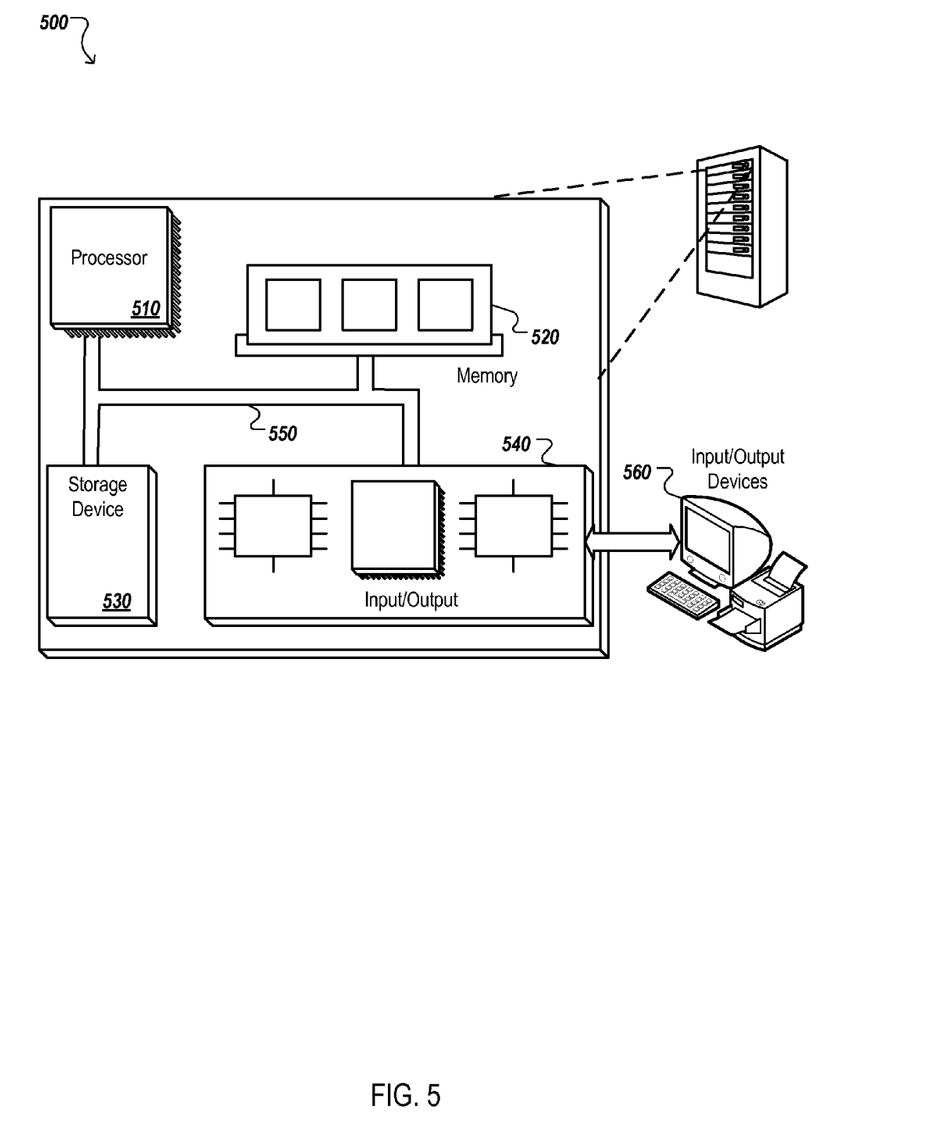
FIG. 5 is a block diagram of an example data processing apparatus.

FIG. 5 is a block diagram of an example data processing apparatus 500. The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method implemented by data processing apparatus, the method comprising:
  receiving, from a particular source network of a plurality of source networks and at an edge device external to the particular source network and within a second network, a first network packet, the first network packet including a first inner header, the first inner header including i) a first source address specifying a user device included in the particular source network from which the first network packet originated, and ii) a first destination address specifying a destination server to which the first network packet is addressed;

selecting a particular identifier for the particular source network from a plurality of routable identifiers that each uniquely identify one of the plurality of source networks, the particular identifier being different from the first source address;

encapsulating the first network packet within a first encapsulation packet, the first encapsulation packet including a first outer header, the first outer header including i) a first outer source address specifying the particular identifier, and ii) a first outer destination address that is the first destination address;

routing the first encapsulation packet to the destination server within the second network;

receiving, from the destination server, a second encapsulation packet, the second encapsulation packet including a second network packet that includes a second outer header, the second outer header including i) a second outer source address that is the first destination address specifying the destination server from which the second encapsulation packet originated, and ii) a second destination address specifying the particular identifier to which the second encapsulation packet is addressed;

extracting the second network packet from the second encapsulation packet, the second network packet including a second inner header, the second inner header including i) a second source address that is the first destination address, and ii) a second destination address that is the first source address; and routing the second network packet to the particular source network based on the particular identifier.

2. The method of claim 1, wherein encapsulating the first network packet within the first encapsulation packet comprises using IP in IP encapsulation to encapsulate the first network packet.

3. The method of claim 1, wherein encapsulating the first network packet within the first encapsulation packet comprises using Generic Routing Encapsulation to encapsulate the first network packet.

4. The method of claim 1, wherein the first outer header of the first encapsulation packet includes a packet protocol field, and wherein encapsulating the first network packet within a first encapsulation packet comprises specifying a value for the packet protocol field that indicates that the first encapsulation packet encapsulates the first network packet.

5. The method of claim 1, wherein routing the first encapsulation packet to the destination server comprises providing the first encapsulation packet to a network load balancer within the second network.

6. The method of claim 1, wherein the edge device is one of a plurality of edge devices within the second network, and wherein the method further comprises:

broadcasting, to the second network, a reachability indicator that specifies that the edge device is in communication with the particular source network.

7. The method of claim 1, wherein the edge device has an edge device identifier that uniquely identifies the edge device within the second network, and wherein the particular identifier selected for the particular source network is different from the edge device identifier.

8. The method of claim 1, wherein the edge device is one of a plurality of edge devices within the second network, and wherein the method further comprises:

broadcasting, to the second network, a reachability indicator that specifies that the edge device is in communication with the plurality of source networks.

9. A method implemented by data processing apparatus, the method comprising:

receiving, by a data processing apparatus and from an edge device, a first encapsulation packet;

determining, based on a packet protocol field included in the first encapsulation packet, that the first encapsulation packet encapsulates a first network packet, and in response to the determination:

identifying a first outer source address included in a first outer header of the first encapsulation packet, the first outer source address including a particular identifier of a plurality of routable identifiers that each uniquely identify one of a plurality of source networks, wherein the particular identifier specifies a particular source network of the plurality of source networks from which the first network packet originated;

recording the first outer source address in a network connection table;

extracting the first network packet from the first encapsulation packet, the first network packet including a first inner header, the first inner header including i) a first source address specifying a user device from which the first network packet originated, and ii) a first destination address specifying the data processing apparatus to which the first network packet is addressed;

processing the first network packet;

generating a second network packet, the second network packet including a second inner header, the second inner header including i) a second source address that is the first destination address that specifies the data processing apparatus, and ii) a second destination address that is the first source address to which the second network packet is addressed;

obtaining the first outer source address from the network connection table;

encapsulating the second network packet within a second encapsulation packet, the second encapsulation packet including the second network packet that includes a second outer header, the second outer header including i) a second outer source address that is the first destination address that specifies the data processing apparatus, and ii) an outer destination address that is the first outer source address to which the second encapsulation packet is addressed; and routing the second encapsulation packet to the particular source network specified by the first outer source address based on the particular identifier.

10. The method of claim 9, further comprising:

receiving, by the data processing apparatus and from a network device, a third network packet;

determining, based on a packet protocol field included in the third network packet, that the third network packet does not encapsulate another network packet; and processing the third network packet.

11. The method of claim 9, wherein the data processing apparatus and the edge device are within a second network that is separate from particular source network from which the first network packet originated.

12. A system comprising:
one or more data processing apparatus; and
a data storage device storing instructions that, when executed by the one or more data processing apparatus, cause the data processing apparatus to perform operations comprising:
receiving, from a particular source network of a plurality of source networks and at an edge device external to the particular source network and within a second network, a first network packet, the first network packet including a first inner header, the first inner header including i) a first source address specifying a user device included in the particular source network from which the first network packet originated, and ii) a first destination address specifying a destination server to which the first network packet is addressed;
selecting a particular identifier for the particular source network from a plurality of routable identifiers that each uniquely identify one of the plurality of source networks, the particular identifier being different from the first source address;
encapsulating the first network packet within a first encapsulation packet, the first encapsulation packet including a first outer header, the first outer header including i) a first outer source address specifying the particular identifier, and ii) a first outer destination address that is the first destination address;
routing the first encapsulation packet to the destination server within the second network;
receiving, from the destination server, a second encapsulation packet, the second encapsulation packet including a second network packet that includes a second outer header, the second outer header including i) a second outer source address that is the first destination address specifying the destination server from which the second encapsulation packet originated, and ii) a second destination address specifying the particular identifier to which the second encapsulation packet is addressed;
extracting the second network packet from the second encapsulation packet, the second network packet including a second inner header, the second inner header including i) a second source address that is the first destination address, and ii) a second destination address that is the first source address; and
routing the second network packet to the particular source network based on the particular identifier.

13. The system of claim 12, wherein encapsulating the first network packet within the first encapsulation packet comprises using IP in IP encapsulation to encapsulate the first network packet.

14. The system of claim 12, wherein encapsulating the first network packet within the first encapsulation packet comprises using Generic Routing Encapsulation to encapsulate the first network packet.

15. The system of claim 12, wherein the first outer header of the first encapsulation packet includes a packet protocol field, and wherein encapsulating the first network packet within a first encapsulation packet comprises specifying a value for the packet protocol field that indicates that the first encapsulation packet encapsulates the first network packet.

16. The system of claim 12, wherein routing the first encapsulation packet to the destination server comprises providing the first encapsulation packet to a network load balancer within the second network.

17. The system of claim 12, wherein the edge device is one of a plurality of edge devices within the second network, and wherein the operations further comprises:
broadcasting, to the second network, a reachability indicator that specifies that the edge device is in communication with the particular source network.

18. The system of claim 12, wherein the edge device has an edge device identifier that uniquely identifies the edge device within the second network, and wherein the particular identifier selected for the particular source network is different from the edge device identifier.

19. A non-transitory computer readable medium storing instructions that, when executed by a data processing apparatus, cause the data processing apparatus to perform operations comprising:
receiving, from a particular source network of a plurality of source networks and at an edge device external to the particular source network and within a second network, a first network packet, the first network packet including a first inner header, the first inner header including i) a first source address specifying a user device included in the particular source network from which the first network packet originated, and ii) a first destination address specifying a destination server to which the first network packet is addressed;
selecting a particular identifier for the particular source network from a plurality of routable identifiers that each uniquely identify one of the plurality of source networks, the particular identifier being different from the first source address;
encapsulating the first network packet within a first encapsulation packet, the first encapsulation packet including a first outer header, the first outer header including i) a first outer source address specifying the particular identifier, and ii) a first outer destination address that is the first destination address;
routing the first encapsulation packet to the destination server within the second network;
receiving, from the destination server, a second encapsulation packet, the second encapsulation packet including a second network packet that includes a second outer header, the second outer header including i) a second outer source address that is the first destination address specifying the destination server from which the second encapsulation packet originated, and ii) a second destination address specifying the particular identifier to which the second encapsulation packet is addressed;
extracting the second network packet from the second encapsulation packet, the second network packet including a second inner header, the second inner header including i) a second source address that is the first destination address, and ii) a second destination address that is the first source address; and
routing the second network packet to the particular source network based on the particular identifier.

* * * * *